United States Patent [19]

Kawana

[11] Patent Number: 5,357,387
[45] Date of Patent: Oct. 18, 1994

[54] DISK DRIVING APPARATUS WITH INCLINED SURFACE ON ENGAGING PIN AND WITH PROTECTOR PLATE OVER MOTOR

[75] Inventor: Jiroh Kawana, Hanamaki, Japan

[73] Assignee: Matsushita Electric Industrial Co., Ltd., Osaka, Japan

[21] Appl. No.: 940,324

[22] Filed: Sep. 3, 1992

[30] Foreign Application Priority Data

Sep. 11, 1991 [JP] Japan .................. 3-231419
Sep. 11, 1991 [JP] Japan .................. 3-231420

[51] Int. Cl.⁵ ............................................. G11B 5/016
[52] U.S. Cl. ..................................................... 360/99.05
[58] Field of Search .......................... 360/99.04, 99.05

[56] References Cited

U.S. PATENT DOCUMENTS

| | | | |
|---|---|---|---|
| 4,672,486 | 6/1987 | Bettini | 360/99.05 |
| 4,697,216 | 9/1987 | Tsukahara | 360/99.05 X |
| 4,758,915 | 7/1988 | Sakaguchi | 360/99.04 |
| 4,760,476 | 7/1988 | Hasegawa et al. | |
| 4,855,850 | 8/1989 | Nagaoka | 360/99.05 X |

*Primary Examiner*—A. J. Heinz
*Attorney, Agent, or Firm*—Stevens, Davis, Miller & Mosher

[57] ABSTRACT

A storage medium disk driving apparatus of a first embodiment includes a rotary plate including a centering section and a recessed section, a fixing plate received in the recessed section and having a proximal end portion pivotally attached to a peripheral portion of the rotary plate, and an engaging projection formed on a distal end portion of the fixing plate and having an inclined surface formed on a distal side portion thereof. When elastic deformation of the fixing plate is caused by pressing its distal end portion, the inclined surface moves so as to extend in parallel to the rotary plate. The apparatus of a second embodiment includes a protector plate fixed in parallel to the rotary plate to thereby cover the rear side of the rotary plate.

10 Claims, 5 Drawing Sheets

DISK DRIVING APPARATUS WITH INCLINED SURFACE ON ENGAGING PIN AND WITH PROTECTOR PLATE OVER MOTOR

BACKGROUND OF THE INVENTION

The present invention relates to a storage medium disk driving apparatus used as, for example, a floppy disk drive which is an auxiliary storage apparatus of a computer, a word processor or the like.

A conventional storage medium disk driving apparatus of this type is illustrated in FIGS. 7 to 9. A centering projection 2 (a distal end portion of an output shaft) connected with a motor is formed on a central portion of the surface of a rotary plate 1. On a peripheral portion of the rotary plate 1, a recessed section 4 opened toward the top surface side and an opening section 5 opened through the bottom of the recessed section 4 are formed substantially along a peripheral direction of the rotary plate 1. A fixing plate 6 is provided inside of the recessed section 4. A proximal end portion 6b of the fixing plate 6 is pivotally attached on the peripheral portion of the rotary plate 1 through a fulcrum pin 7 in such a manner that a distal end portion 6a of the fixing plate 6 can be moved in and out of the opening section 5. The fixing plate 6 is biased in a direction away from the centering projection 2 by means of a spring (not shown), and is supported in contact with an outer peripheral portion 1a of the rotary plate 1. Thus, a cylindrical engaging projection 18 formed of a pin or a roller provided on the distal end portion 6a of the fixing plate 6 is positioned at a predetermined distance from the center of the rotary plate 1.

In the storage medium disk driving apparatus of the above-described structure, when a hub P of a storage medium disk is pressed, through a casing containing the storage medium disk, against the front surface of the rotary plate 1 in concentric and parallel relation, the distal end portion 6a of the fixing plate 6 is pressed by the hub P through the engaging projection 18 so as to cause elastic deformation of the fixing plate 6. In consequence, the distal end portion 6a is pushed in the opening section 5 of the rotary plate 1, and also, the centering projection 2 provided on the rotary plate 1 is engaged in a centering hole formed in the storage medium disk. Then, when rotating the rotary plate 1 at a low speed while sliding the engaging projection 18 on the hub P of the storage medium disk, the rotary plate 1 is rotated in concentric relation with the storage medium disk, and the engaging projection 18 located at the predetermined distance from the center of this rotation is engaged in an engaging hole formed in the storage medium disk. Since the hub P of the storage medium disk is no longer affected by the spring force to separate it from the rotary plate 1, the hub P of the storage medium disk is magnetically attracted by a magnet plate 1B provided on the surface of the rotary plate 1, and is brought into contact with a hub 3 of the rotary plate 1, thereby maintaining the engagement between the engaging projection 18 on the side of the rotary plate 1 and the engaging hole of the storage medium disk. Therefore, when the motor is driven, rotational torque is transmitted from the rotary plate 1 to the storage medium disk so that the storage medium disk will be rotated in concentric relation with the rotary plate 1.

However, when the hub P of the storage medium disk causes elastic deformation of the fixing plate 6 through the engaging projection 18 so that the distal end portion 6a of the fixing plate 6 is pushed in the opening section 5 of the rotary plate 1, the engaging projection 18 is inclined, as shown in FIG. 9, and the engaging projection 18 thus inclined is pressed against the hub P of the storage medium disk by the force of the fixing plate 6. In this condition, the rotary plate 1 is rotated idly with respect to the storage medium disk until the engaging projection 18 provided on the distal end portion 6a of the fixing plate 6 is engaged in the engaging hole formed in the hub P of the storage medium disk. Since the engaging projection 18 is shaped cylindrically, an edge 18a of the engaging projection 18 will be pressed against the hub P of the storage medium disk, depending upon an angle of inclination of the projection 18, so that the hub P of the storage medium disk will be damaged during a long time use. Due to such a damage of the hub P, it has been feared that the appearance of the storage medium disk will be spoiled, and that the magnetic surface of the storage medium disk will be damaged by metallic powder shaved from the hub P.

Moreover, when the distal end portion 6a of the fixing plate 6 is pressed by the hub P of the storage medium disk through the engaging projection 18, it penetrates through the opening section 5 of the rotary plate 1 and protrudes from the rear side of the rotary plate 1 owing to the elastic deformation of the fixing plate 6. If the impact when the hub P of the storage medium disk collides against the rotary plate 1 is large, the fixing plate 6 is momentarily bent by a large degree, and the distal end portion 6a largely protrudes from the rear side of the rotary plate 1, as shown in FIG. 9. Consequently, a part of the motor (e.g., a stator coil portion) brought into contact with the fixing plate 6 will be damaged, or the fixing plate 6 will be caught on some motor part so that the fixing plate 6 and the motor part will be damaged as a result of the subsequent rotation of the rotary plate 1. Because of such fears, the rotary plate 1 and the motor have conventionally been located to have a rather large space interposed therebetween, to thereby prevent the distal end portion 6a of the fixing plate 6 from contacting with motor parts.

SUMMARY OF THE INVENTION

The present invention has been achieved to solve the above-described problems. It is an object of the invention to provide a storage medium disk driving apparatus in which a hub of a storage medium disk can be prevented from being damaged by an engaging projection attached to a distal end portion of a fixing plate provided on a rotary plate during idle rotation of the rotary plate before the storage medium disk is set on it.

Another object of the invention is to provide a storage medium disk driving apparatus in which a distal end portion of a fixing plate is prevented from largely protruding from the rear side of a rotary plate when mounting a storage medium disk on it so that the rotary plate and a motor can be located at a shorter distance in order to improve compactness of the whole apparatus.

In order to attain the first object, the storage medium disk driving apparatus according to one aspect of the invention comprises a rotary plate including a centering section formed on a central portion of the surface and a recessed section formed on a peripheral portion thereof to be opened toward the top surface side, a fixing plate received in the recessed section and having a proximal end portion pivotally attached to the surface of the peripheral portion of the rotary plate, and an engaging projection formed on a distal end portion of the fixing plate and having an inclined surface formed on a distal side portion thereof, such that when elastic deformation of the fixing plate is caused by pressing its distal end portion, the inclined surface extends substantially in parallel to the rotary plate.

With this structure, during idle rotation of the rotary plate before a storage medium disk is set on it, the inclined surface formed on the distal end portion of the engaging projection at the side of the pivotally attached end portion of the fixing plate extends substantially in parallel to the rotary plate and is pressed on a hub of the storage medium disk in planar contact condition. Therefore, no concentration of the load will be induced, and the hub of the storage medium disk will not be damaged.

In order to attain the second object, the storage medium disk driving apparatus according to another aspect of the invention comprises a rotary plate including a centering section formed on a central portion of the surface, a recessed section formed on a peripheral portion thereof to be opened toward the top surface side, an opening section formed on the peripheral portion thereof to be opened through the bottom of the recessed section, a fixing plate received in the recessed section and having a proximal end portion pivotally attached to the peripheral portion of the rotary plate so that a distal end portion of the fixing plate can be moved in and out of the opening section, an engaging projection formed on a distal end portion of the fixing plate and projecting from the surface of the rotary plate, and a protector plate fixedly provided substantially in parallel to the rotary plate to thereby cover the rear side of it.

With this structure, even if the distal end portion of the fixing plate is pressed by the hub of the storage medium disk through the engaging projection so that it penetrates through the opening section of the rotary plate and protrudes largely from the rear side of the rotary plate momentarily owing to the elastic deformation of the fixing plate, it will be brought into contact with the protector plate so as not to protrude further. Thus, the space between the rotary plate and the motor can be decreased.

DETAILED DESCRIPTION OF THE INVENTION

Figure 1:
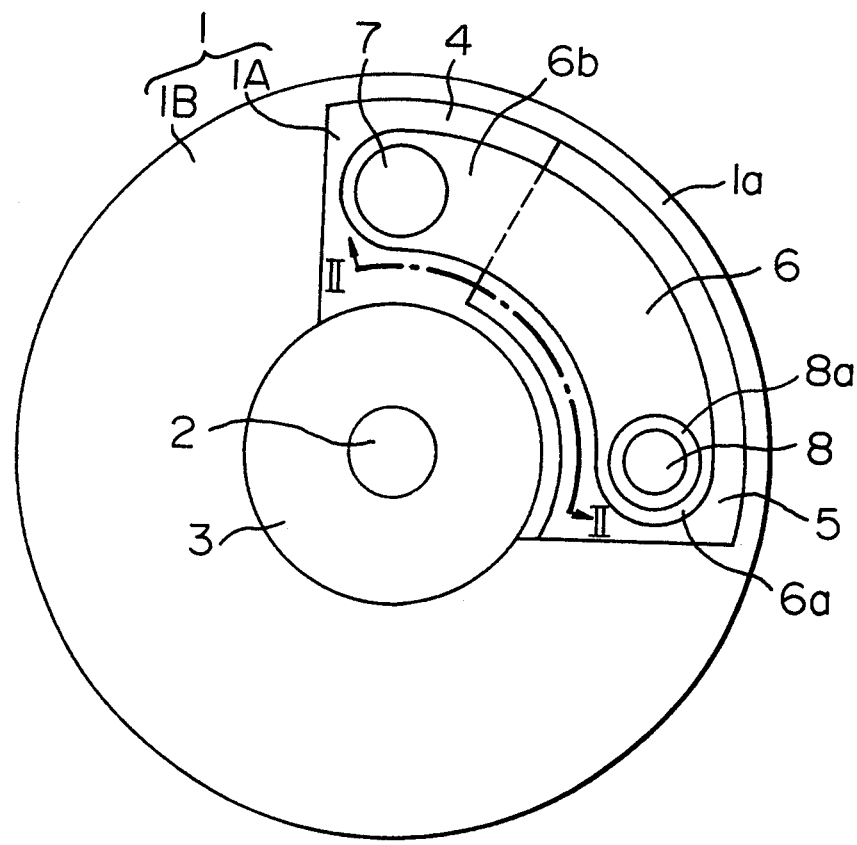
FIG. 1 is a front view of a storage medium disk driving apparatus according to one embodiment of the present invention.
Figure 8:
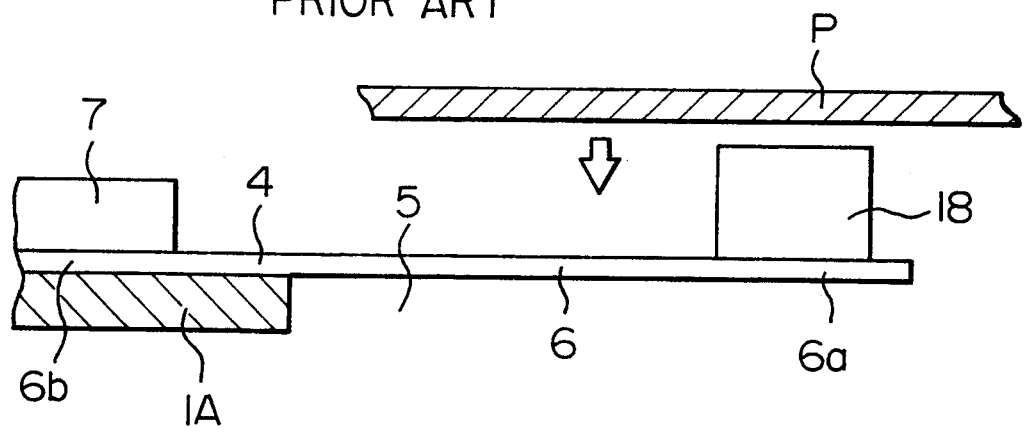
FIG. 8 is a cross-sectional view taken along the line VIII—VIII of FIG. 7.
Figure 7:
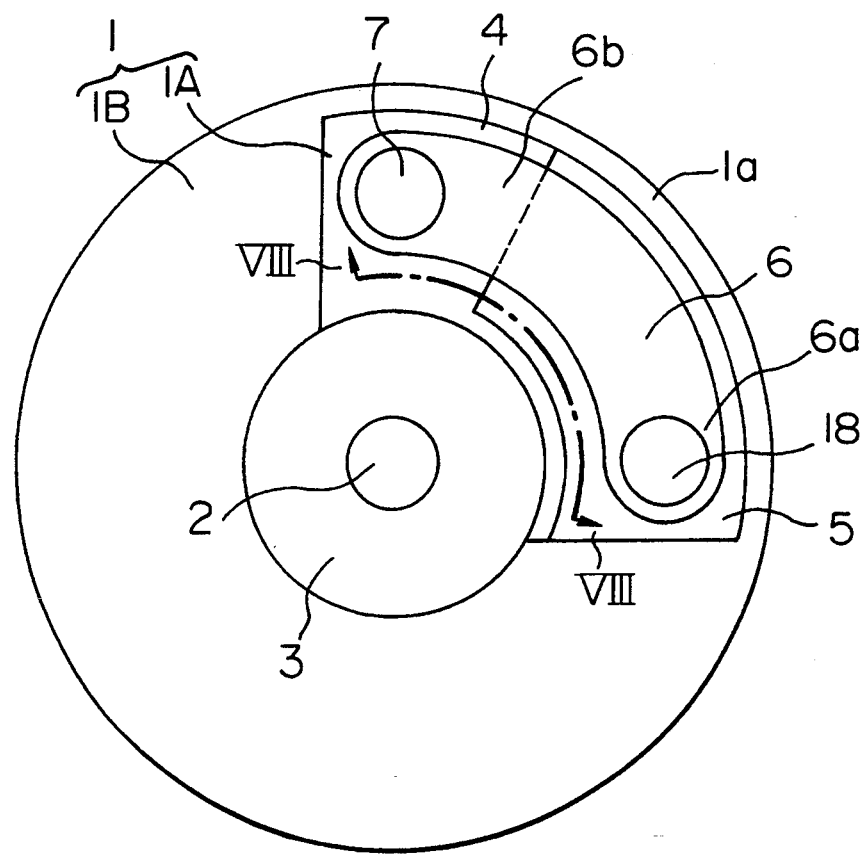
FIG. 7 is a front view of a storage medium disk driving apparatus in a conventional example.

One embodiment of the present invention will be hereinafter described with reference to FIGS. 1 to 3.

Component parts which are substantially the same as those of the above-described conventional example are denoted by common reference numerals.

In the figures, reference numeral 1 designates a rotary plate comprising a rotary plate body 1A and an annular magnet plate 1B securely fixed on the surface of a peripheral portion of the rotary plate body 1A.

A hub 3 including a centering projection 2 is formed at a central portion of the rotary plate 1. The centering projection 2 is formed of an output shaft of a motor (not shown) which penetrates through a central portion of the hub 3. On the peripheral portion of the rotary plate 1, a recessed section 4 opened toward the top surface side and an opening section 5 opened through the bottom of the recessed section 4 are formed substantially along a peripheral direction of the rotary plate 1.

Reference numeral 6 designates a fixing plate (a leaf spring in the embodiment) which is provided inside of the recessed section 4 of the rotary plate 1. A proximal end portion 6b of the fixing plate 6 is pivotally attached on the peripheral portion of the rotary plate 1 through a fulcrum pin 7 in such a manner that a distal end portion 6a of the fixing plate 6 can be moved in and out of the opening section 5. The distal end portion 6a of the fixing plate 6 is formed with an engaging projection 8 formed of a pin or a roller which is projected from the surface of the rotary plate 1. The fixing plate 6 is biased in a direction away from the hub 3 by means of a spring (not shown), and is supported in contact with an outer peripheral portion 1a of the rotary plate 1. Thus, the engaging projection 8 is positioned at a predetermined distance from the center of the rotary plate 1.

An inclined surface 8a (i.e., a tapered surface in the case of a roller) is formed on a distal side portion of the engaging projection 8. When the distal end portion 6a of the fixing plate 6 is pressed into the opening section 5 of the rotary plate 1 so as to cause elastic deformation of the fixing plate 6, the inclined surface 8a will extend in parallel to the rotary plate 1, as will be described later. During the elastic deformation of the fixing plate 6, the inclined surface 8a may be inclined gradually upwardly toward the back side of a direction of rotation of the rotary plate 1 instead of extending in parallel to the rotary plate 1. The present invention includes such a case.

The operation of the storage medium disk driving apparatus of the above-described structure will now be described with reference to FIG. 3.

First, when a hub P of a storage medium disk is pressed, through a casing containing the storage medium disk, against the front surface of the rotary plate 1 in concentric and parallel relation,.the distal end portion 6a of the fixing plate 6 is pressed by the hub P through the engaging projection 8 to thereby cause elastic deformation of the fixing plate 6. In consequence, the distal end portion 6a is pushed in the opening section 5 of the rotary plate 1, and also, the centering projection 2 provided on the rotary plate 1 is engaged in a centering hole formed in the storage medium disk. Then, when rotating the rotary plate 1 at a low speed while sliding the engaging projection 8 on the hub P of the storage medium disk, the rotary plate 1 is rotated in concentric relation with the storage medium disk, and the engaging projection 8 located at the predetermined distance from the center of this rotation is engaged in an engaging hole formed in the storage medium disk. Since the hub P of the storage medium disk is no longer affected by the spring force to separate it from the rotary plate 1, the hub P of the storage medium disk is magnetically attracted by the magnet plate 1B provided on the surface of the rotary plate 1, and is brought into contact with the hub 3 of the rotary plate 1, thereby maintaining the engagement between the engaging projection 8 on the side of the rotary plate 1 and the engaging hole of the storage medium disk. Because the storage medium disk is mounted on the rotary plate 1 in this manner, rotational torque is transmitted from the rotary plate 1 to the storage medium disk when the motor is driven, so that the storage medium disk will be rotated in concentric relation with the rotary plate 1.

Figure 3:
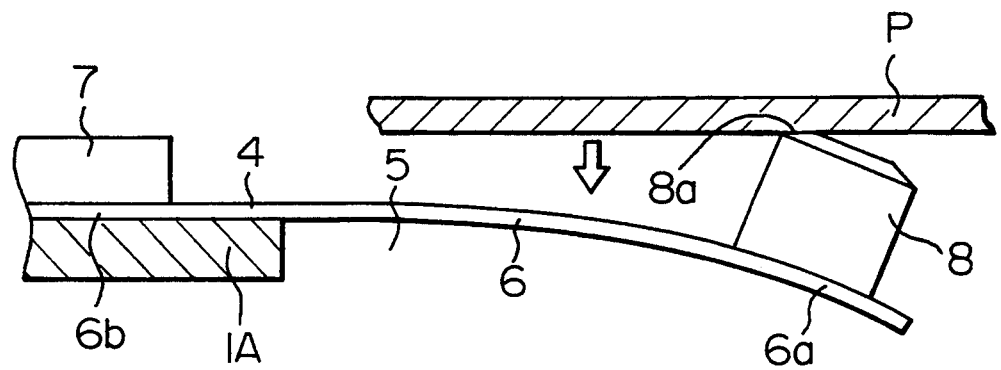
FIG. 3 is an operation explaining diagram corresponding to FIG. 2.

By the way, when the distal end portion 6a of the fixing plate 6 is pushed in the opening section 5 of the rotary plate 1, the engaging projection 8 is inclined, as shown in FIG. 3, and the engaging projection 8 thus inclined is pressed against the hub P of the storage medium disk by the force of the fixing plate 6. In this condition, the rotary plate 1 is rotated idly with respect to the storage medium disk until the engaging projection 8 is engaged in the engaging hole formed in the hub P of the storage medium disk. However, the inclined surface 8a formed on the distal side portion of the engaging projection 8 extends substantially in parallel to the rotary plate 1 and is pressed on the hub P of the storage medium disk in planar contact condition. Therefore, concentration of the load observed in the conventional example is not induced during the idle rotation of the rotary plate 1.

When the casing containing the storage medium disk is separated from the rotary plate 1 in a mechanical manner contrary to the above-described manner, the hub P of the storage medium disk overcomes the magnetic attraction force and is detached from the rotary plate 1.

In this embodiment, as described so far, the inclined surface 8a is simply formed on the distal side portion of the engaging projection 8 provided on the distal end portion 6a of the fixing plate 6 so that even if the rotary plate 1 is rotated idly, the hub P can be prevented from being damaged by the engaging projection 8 during a long time use of the storage medium disk.

Figure 4:
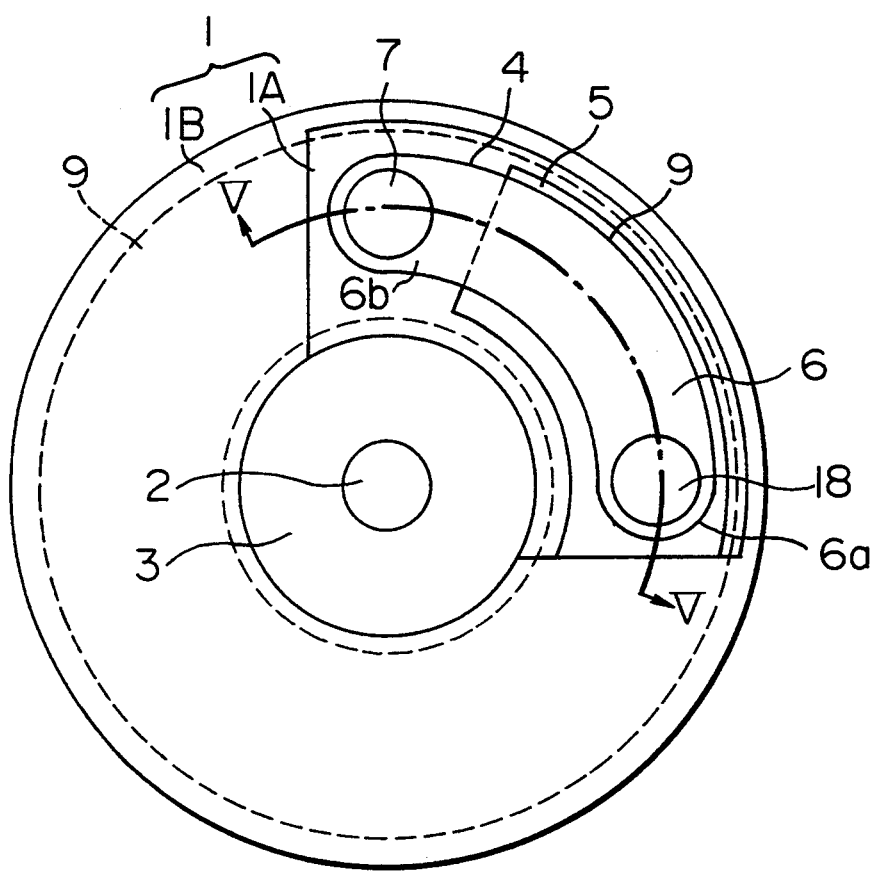
FIG. 4 is a front view of a storage medium disk driving apparatus according to another embodiment of the invention.
Figure 5:
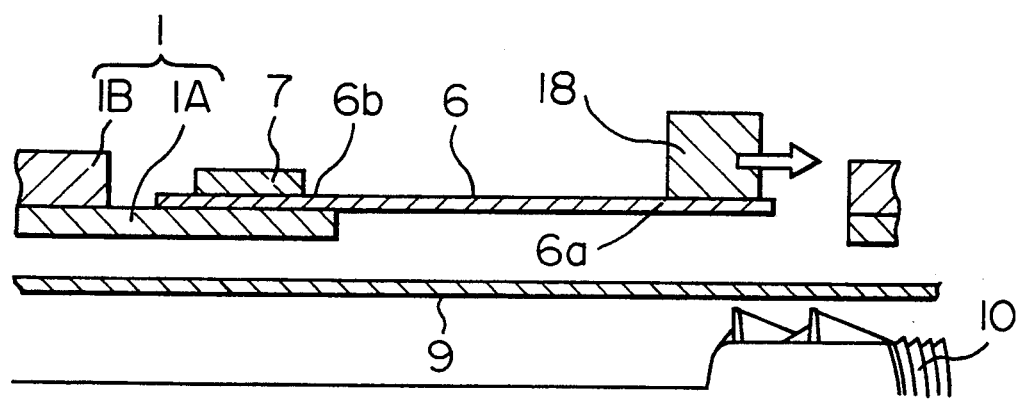
FIG. 5 is a cross-sectional view taken along the line V—V of FIG. 4.
Figure 6:
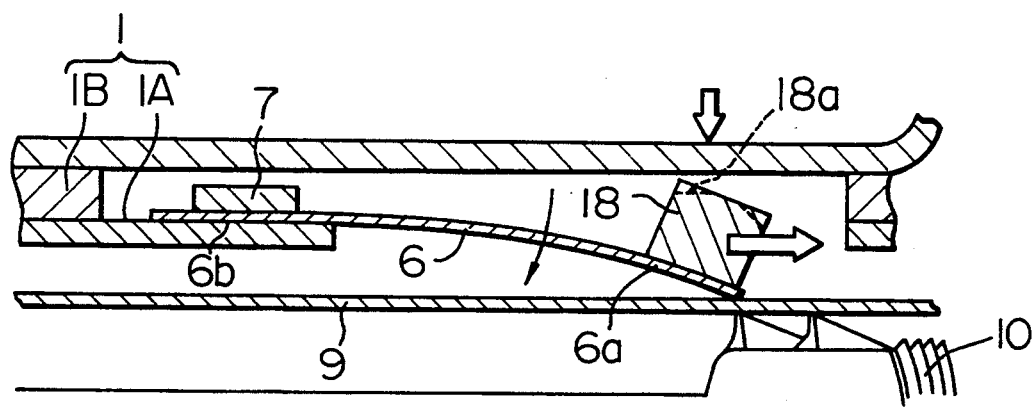
FIG. 6 is an operation explaining diagram corresponding to FIG. 5.
Figure 9:
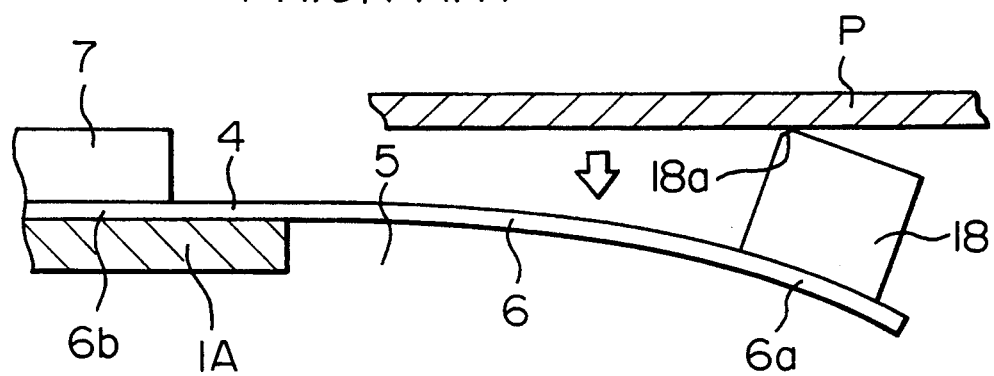
FIG. 9 is an operation explaining diagram corresponding to FIG. 8.

Another embodiment of the invention will be next described with reference to FIGS. 4 to 6.

Component parts which are substantially the same as those of the above-described embodiment are denoted by common reference numerals so that explanations thereof will be omitted.

This embodiment is different from the first embodiment in that a protector plate 9 is provided between the rotary plate 1 and the motor and extends in parallel to the rotary plate 1 so as to cover the rear side of the rotary plate 1. The surface of the protector plate 9 on the side of the rotary plate 1 is formed to be smooth, and also, the protector plate 9 itself is fixed on a frame (not shown) which allows the protector plate 9 to rotate in concentric relation with the rotary plate 1, so that the distal end portion 6a of the fixing plate 6 will not be caught on the protector plate 9.

The operation of the storage medium disk driving apparatus of the above-described structure will now be described with reference to FIG. 6.

First, when the hub P of a storage medium disk is pressed, through a casing containing the storage medium disk, against the front surface of the rotary plate 1 in concentric and parallel relation, the distal end portion 6a of the fixing plate 6 is pressed by the hub P of the storage medium disk through the engaging projection 18, so that it penetrates through the opening section 5 of the rotary plate 1 and protrudes from the rear side of the rotary plate 1 owing to the elastic deformation of the fixing plate 6, and that the centering projection 2 provided on the rotary plate 1 is engaged in the centering hole formed in the storage medium disk.

Even if the fixing plate 6 is bent by a large degree by the shock when the hub P of the storage medium disk collides against the rotary plate 1 and the distal end portion 6a is about to protrude largely from the rear side of the rotary plate 1, the tip of the distal end portion 6a will be brought into contact with the protector plate 9 covering the rear side of the rotary plate 1 so as not to protrude further. With the interposition of the protector plate 9, the distal end portion 6a of the fixing plate 6 will not be contacted with parts of the motor (e.g., a stator coil portion 10). If the distal end portion 6a of the fixing plate 6 is kept in contact with the protector plate 9 during the subsequent rotation of the rotary plate 1, the distal end portion 6a of the fixing plate 6 will be slid on the surface of the protector plate 9 which is smooth. In the case where the sliding resistance at that time is large, the rotatable protector plate 9 will be rotated along with the distal end portion 6a of the fixing plate 6.

The rest of the operation of this apparatus is substantially the same as that of the first embodiment.

In this embodiment, as described above, the protector plate 9 having a smooth surface extends in parallel to the rotary plate 1 so as to cover the rear side of it, and is provided rotatably in concentric relation with will the rotary plate 1. Consequently, even if the fixing plate 6 is momentarily bent by a large degree by the shock when the hub P of the storage medium disk collides against the rotary plate 1 and the distal end portion 6a is about to protrude largely from the rear side of the rotary plate 1, the protector plate 9 covering the rear side of the rotary plate 1 suppresses further protrusion of the distal end portion 6a of the fixing plate 6 in order to prevent it from contacting with parts of the motor (e.g., the stator coil portion 10). Also, even if the distal end portion 6a of the fixing plate 6 is kept in contact with the surface of the protector plate 9 during the subsequent rotation of the rotary plate 1, the distal end portion 6a of the fixing plate 6 can be slid on the surface because it is smooth. In the case where such sliding can not be effected, the protector plate 9 can be rotated along with the distal end portion 6a of the fixing plate 6, thus preventing damage to both the members. Therefore, the driving apparatus can endure a long time use in a favorable condition.

The protector plate 9 of this embodiment has a smooth surface and is rotatable in concentric relation with the rotary plate 1. However, in the case where the protector plate 9 is only intended to suppress further protrusion of the distal end portion 6a of the fixing plate 6 without contacting with the distal end portion 6a during the idle rotation of the rotary plate 1, the surface may not be necessarily smooth, and also, the protector plate 9 may not always be rotatable in concentric relation with the rotary plate 1.

Figure 2:
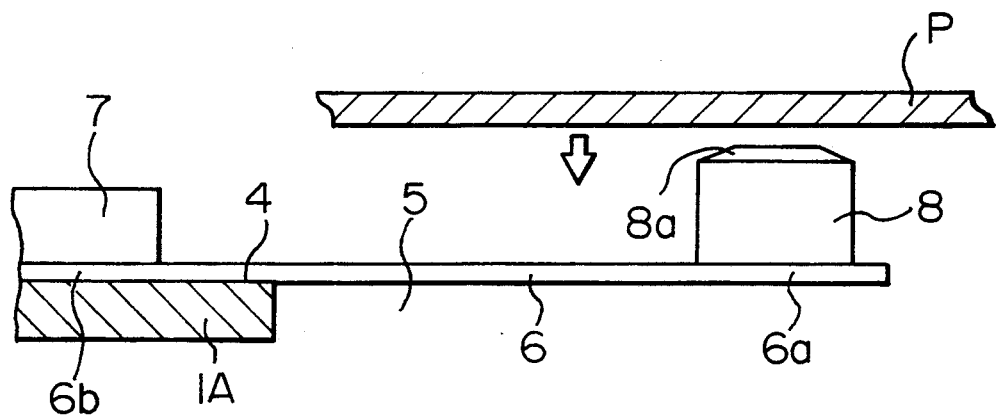
FIG. 2 is a cross-sectional view taken along the line II—II of FIG. 1.

It will be understood that the engaging projection 18 may have an inclined surface 18a (shown by a dotted line in FIG. 6) as similar to the inclined surface 8a of the embodiment shown in FIGS. 1-3.

According to the present invention, as described heretofore, the inclined surface is formed on the distal side portion of the engaging projection provided on the distal end portion of the fixing plate, and the engaging projection is pressed on the hub of the storage medium disk in planar contact condition through this inclined surface. Therefore, while the rotary plate is rotated idly until the engaging projection is engaged in the engaging hole formed in the hub of the storage medium disk, concentration of the load observed in the conventional example is not induced, so that the hub can be prevented from being damaged by the engaging projection during a long time use of the storage medium disk. In consequence, the appearance of the storage medium disk will not be spoiled due to a damage of the hub, and there is generated no metallic powder which might induce some damage of the magnetic surface of the storage medium disk and so forth. Moreover, the inclined surface can be readily formed on the distal side portion of the engaging projection by simple machining or such operation. Thus, the invention can produce excellent effects. For instance, it can be applied to an existing apparatus easily at low cost, and the storage medium disk can be set in the apparatus without damaging the hub of the storage medium disk.

Also, according to the invention, the protector plate is located in parallel to the rotary plate so as to cover the rear side of it. Consequently, even if the fixing plate is bent by a large degree by the shock when the hub of the storage medium disk collides against the rotary plate and the distal end portion of the fixing plate is about to protrude largely from the rear side of the rotary plate, the protector plate suppresses further protrusion of the distal end portion of the fixing plate, thereby preventing the distal end portion from contacting with and damaging parts of the motor. Therefore, a space larger than necessary need not be provided at the rear side of the rotary plate as in the conventional example. As a result, the distance between the rotary plate and the motor can be shortened to improve compactness and durability of the whole apparatus.

What is claimed is:

1. A storage medium disk driving apparatus comprising:
   a rotary plate including a centering section formed on a central portion of a first surface of said rotary plate and a recessed section formed on a peripheral portion of said rotary plate and opened toward said first surface;
   a fixing plate received in said recessed section and having a proximal end portion pivotally attached to a surface of the peripheral portion of said rotary plate; and
   an engaging projection formed on a distal end portion of said fixing plate and having a bevelled surface formed on a distal side portion of said engaging projection, said bevelled surface extending from a peripheral, upstanding side of said engaging projection at a canted angle wherein said bevelled surface is moved to extend substantially in parallel to said rotary plate in response to elastic deformation of said fixing plate caused by a pressing force applied to said distal end portion.

2. A storage medium disk driving apparatus according to claim 1, further including a protector plate fixedly provided substantially in parallel to said rotary plate to thereby cover a second surface of said rotary plate, said first surface and said second surface being disposed on opposite sides of said rotary plate.

3. A storage medium disk driving apparatus according to claim 2, wherein said fixing plate comprises a leaf spring.

4. A storage medium disk driving apparatus according to claim 2, wherein said recessed section comprises an opening section opened through said recessed portion toward said second surface of said rotary plate.

5. A storage medium disk driving apparatus according to claim 4, wherein said opening section is disposed with respect to said distal end portion to permit said distal end portion to move in and out of said opening section during said elastic deformation.

6. A storage medium disk driving apparatus according to claim 5, wherein said protector plate covers said opening section, thereby limiting a range of movement of said distal end portion during said elastic deformation.

7. A storage medium disk driving apparatus according to claim 1, wherein said recessed section comprises an opening section opened through said recessed portion toward a second surface of said rotary plate, said first surface and said second surface being disposed on opposite sides of said rotary plate.

8. A storage medium disk driving apparatus according to claim 7, wherein said opening section is disposed with respect to said distal end portion to permit said distal end portion to move in and out of said opening section during said elastic deformation.

9. A storage medium disk driving apparatus according to claim 1, wherein said fixing plate comprises a leaf spring.

10. A storage medium disk driving apparatus according to claim 1, wherein said first surface is a top surface of said rotary plate.

* * * * *